US005627525A

United States Patent [19]

Kudoh et al.

[11] Patent Number: 5,627,525

[45] Date of Patent: May 6, 1997

[54] ELECTRONIC POCKET NOTEBOOK-TYPE PAGER

[75] Inventors: Kazuhiro Kudoh; Teruyuki Motohashi, both of Tokyo, Japan

[73] Assignee: NEC Corporation, Tokyo, Japan

[21] Appl. No.: 284,049

[22] Filed: Aug. 1, 1994

Related U.S. Application Data

[63] Continuation of Ser. No. 798,728, Nov. 29, 1991, abandoned.

[30] Foreign Application Priority Data

| | | | |
|---|---|---|---|
| Nov. 30, 1990 | [JP] | Japan | 2-336535 |
| Dec. 27, 1990 | [JP] | Japan | 2-414885 |
| Mar. 30, 1991 | [JP] | Japan | 3-093371 |

[51] Int. Cl.[6] ........ H04Q 1/00

[52] U.S. Cl. ........ 340/825.44; 340/825.27; 379/96; 379/57; 364/705.05

[58] Field of Search ........ 340/825.44, 825.47, 340/825.27, 311.1; 379/96, 57; 364/705.5; 455/38.1

[56] References Cited

U.S. PATENT DOCUMENTS

| | | | |
|---|---|---|---|
| Re. 32,365 | 3/1987 | Sebestyen | 340/311.1 |
| 4,277,837 | 7/1981 | Stuckert | 364/705.5 |
| 4,473,824 | 9/1984 | Claytor | 340/825.27 |
| 4,477,807 | 10/1984 | Nakajima et al. | 340/825.44 |
| 4,688,034 | 8/1987 | Je Graaf | 340/825.27 |
| 4,742,352 | 5/1988 | Ishii | 364/705.5 |
| 4,845,491 | 7/1989 | Fascenda | 340/825.27 |
| 5,043,721 | 8/1991 | May | 340/825.44 |
| 5,257,307 | 10/1993 | Ise | 340/825.44 |

FOREIGN PATENT DOCUMENTS

| | | |
|---|---|---|
| 0086255 | 8/1983 | European Pat. Off. . |
| 0342638 | 11/1989 | European Pat. Off. . |

*Primary Examiner*—Brian Zimmerman
*Attorney, Agent, or Firm*—Foley & Lardner

[57] ABSTRACT

A display-equipped radio pager according to the present invention provides a detecting circuit 6 to detect keywords which are distinguished by a specific mark such as double quotation marks for each message received, and another detecting circuit to detect whether the received keyword is already registered in the memory or not. The pager also provides a registering circuit to automatically register the received data related to the keyword into the memory. When a signal including its own call number is received, a call alert is issued, and a display means 8 displays a message included within that signal on a display 9. In addition, when a keyword is detected, the detecting circuit 14 detects whether the received keyword within that message is already registered in the memory or not and, if the same keyword is detected, a registering circuit 15 then registers the data related to the keyword within the message into the memory 10 as additional data.

5 Claims, 8 Drawing Sheets

ELECTRONIC POCKET NOTEBOOK-TYPE PAGER

This application is a continuation of application Ser. No. 07/798,728, filed Nov. 29, 1991, now abandoned.

FIELD OF THE INVENTION

The present invention relates to a display-equipped radio pager and, more particularly, to a display-equipped radio pager which has a function of an electronic pocket notebook to display registered telephone numbers, addresses and the like by keying in keywords, such as personal names and companies.

BACKGROUND OF THE INVENTION

Conventionally, display-equipped radio pagers have been in practical use which alert the user to a pager, when receiving a paging signal containing a selective call number assigned thereto is received, by flickering of an LED (light emitting device) or driving a speaker to beep while displaying on a display device a message contained within the received signal. In addition to these functions commercially available electronic pocket notebook-type pagers have other functions. A pager of this type comprises an input device, such as a keyboard or the like and a memory for storing keywords such as the personal or company names and their related data, for example, telephone numbers or addresses, so that the data stored within that memory may be retrieved for display on the display device by retrieving a keyword keyed in from the input device.

Such a radio pager has been very useful, because it can also be used as the electronic pocket notebook. For example, if a personal name such as Taro Yamada as well as his telephone number, for example, 03-3123-1234, are registered into the memory by keying it in, then it is not necessary to remember his telephone number in full, which is very helpful in business and private life.

A similar pager is disclosed, U.S. Pat. No. Re. 32,365 entitled "Precessing Display Pager" and issued to George Sebestyen. In the disclosed pager, a message or a stored statement can be continuously moved along by using a single line display so that it may be visually read, while a message entered from a keyboard may be transmitted by a cable or over a radio frequency after the check by reading the entered message on the display. In addition, according to U.S. Pat. No. 4,477,807 entitled "Radio Pager with a Display Device" and issued to Takeshi Nakajima and Takashi Ohyagi, a received message is compared with all of the precedingly stored messages and, if the same message is not found in the stored ones, it is stored so that the user can read it by displaying the messages when it is convenient for him.

Further, U.S. Pat. No. 4,473,824 teaches a price quotation system in which quotations transmitted from hand-held transmitters of each bidder may be received stored and displayed by a receiver. But this invention is applied only to a suitable hand-held radio transmitter and receiver for the price quotation system.

As described above, although electronic pocket notebook-type pagers have been known, the known pocket notebook function is completely independent of the paging function. As a consequence, if, for example, a message associated with a personal or company name is received and the user wants to register the received message together with this keyword, it is necessary for the user to carry out the troublesome procedure of keying in the keyword and the received message through the keyboard.

SUMMARY OF THE INVENTION

An object of the present invention is to provide a display-equipped pager which may simplify or make unnecessary the operation of keying in the keyword and retrieving the same.

In order to achieve the foregoing object, a display-equipped pager according to the present invention comprises a first detecting means for detecting keywords included in a received message and a second display means for displaying the data stored in the pager which are related to the detected keyword by keying in a simple code.

In addition, the above-described pager also includes a selective display means to display the stored information related to the selected keyword when a plurality of keywords are detected in the message.

Another object of the present invention is to provide a display-equipped pager which, if a keyword in the message is stored precedingly in the memory, the data accompanying the keyword in the message is automatically registered in addition to the data precedingly stored in the memory.

In order to achieve these objects, in addition to the above-described first detecting means and the second display means, the display-equipped radio pager of the present invention further comprises a second detecting means which detects whether the keyword detected by the first detecting means is included among the keywords precedingly stored in the memory and an automatic registering means to register automatically the data accompanying the received keyword and add to its corresponding data area in the memory when the second detecting means detects therein the received keyword.

Further, the present invention also includes a means to display a mark which indicates that the data in the message has been newly registered into the memory, and further, includes a data class display means which indicates marks on the data displayed from the memory by the second display means, revealing whether it is data keyed in from the keyboard or data registered through the automatic registering means.

It is a further object of the invention to provide a display-equipped radio pager which automatically registers date information as the keyword and schedules corresponding to the date information as its data from the received message to the memory. It is a still further object of the present invention to provide a distinction marking means for indicating whether the received keyword is precedingly registered in the memory or not. It is yet another object of the present invention to provide a notifying means of double scheduling.

In order to achieve the above objects, the display-equipped radio pager according to the present invention detects date information such as year, date, time and day of the week as a keyword and deals with a schedule at the date information as data corresponding to the date information, and has a third registering circuit to register the date information and its schedule when the second detecting circuit detects no received keyword in the memory. The radio pager further provides a distinction marking means which displays a mark which indicates that the received keyword is detected in the memory by the second detecting circuit and also displays another mark which indicates that both the received keyword and its data are newly registered in the memory when the received keyword is not detected in the memory by the second detecting circuit.

The radio pager also provides a different alert which notifies the user that the received date information is detected in the memory.

BRIEF DESCRIPTION OF THE DRAWINGS

These and other objects of the present invention will become apparent from the following description in conjunction with the accompanying drawings, in which.

DETAILED DESCRIPTION OF THE PREFERRED EMBODIMENT

A specific embodiment of the present invention is hereinafter described with reference to the accompanying drawings.

Figure 1:
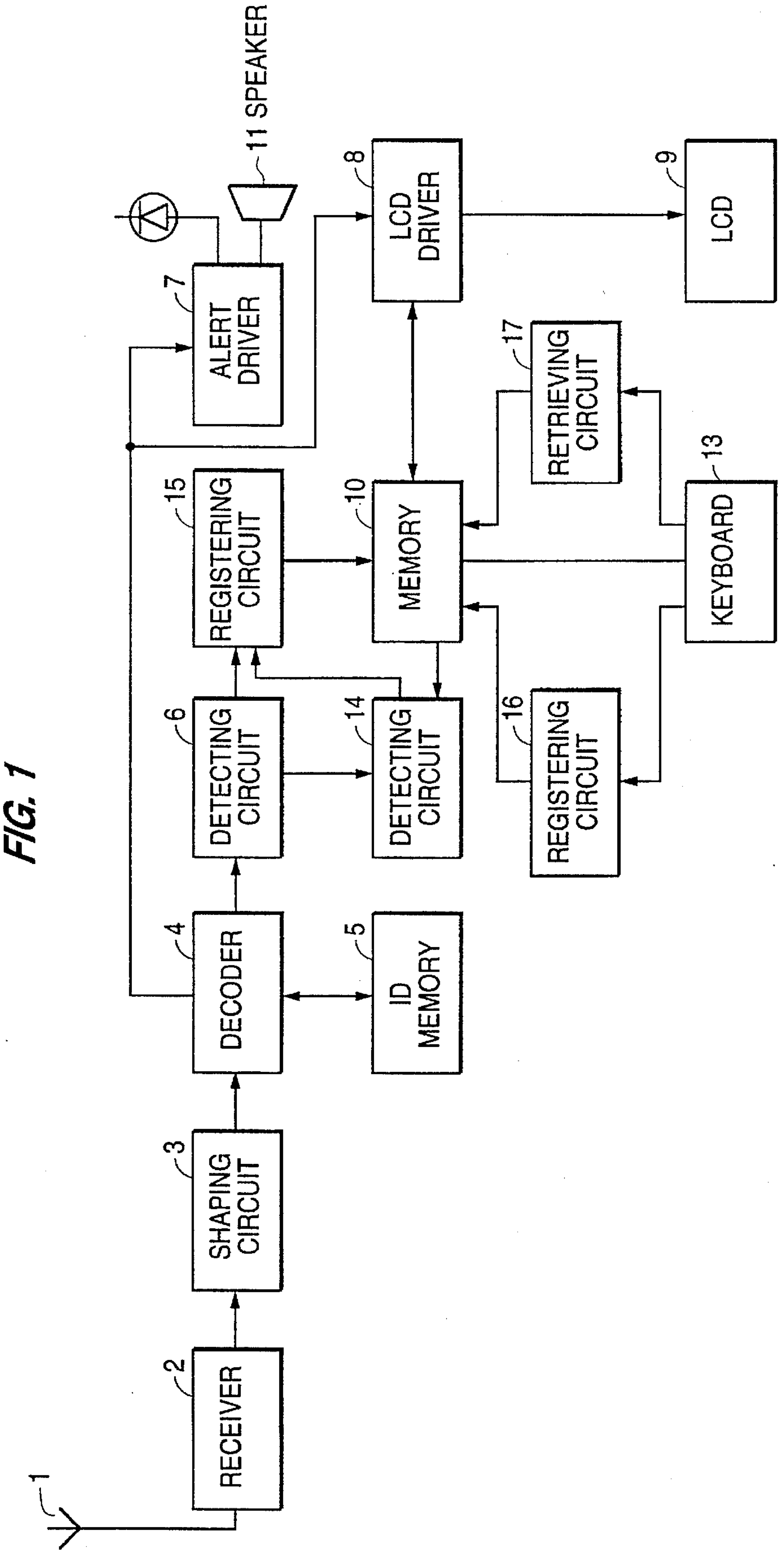
FIG. 1 is a schematic block diagram of the first embodiment of a display-equipped radio pager in accordance with the present invention.
Figure 2:
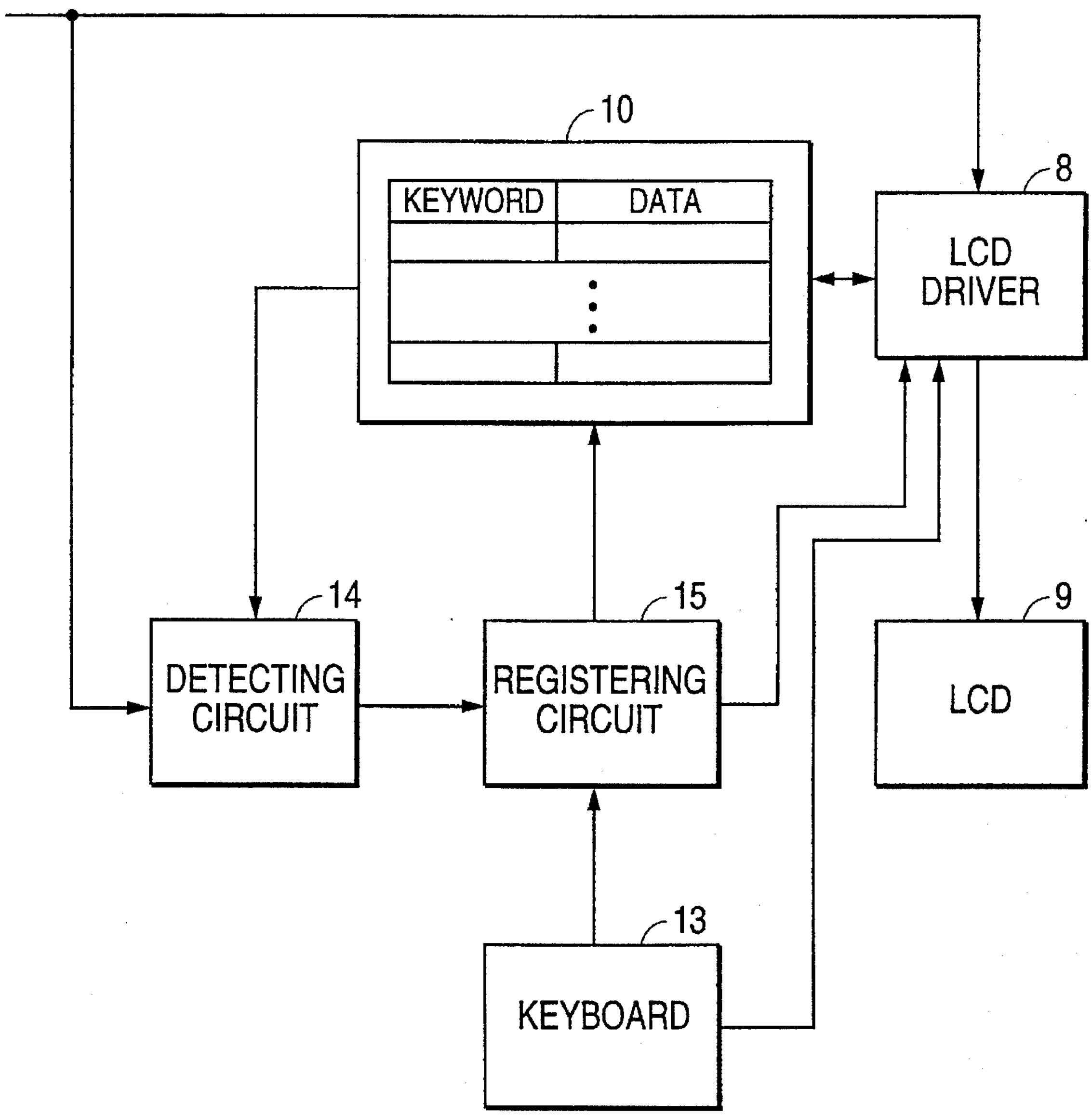
FIG. 2 is a partial functional block diagram of the present invention.

FIG. 1 is a block diagram of the first embodiment of a display-equipped radio pager according to the present invention.

As shown in FIG. 1, the display-equipped radio pager according to the present invention comprises an antenna 1, a receiver 2, a waveform shaper circuit 3, a decoder 4, an identification (ID) number memory portion 5, detecting circuits 6, 14, an alarm driver portion 7, a light crystal display (LCD) driver 8, an LCD 9, a memory 10, an LED (light emitting display) 11, a speaker 12, a keyboard 13, registering circuits 15, 16 and a retrieving circuit 17. The detecting circuit 6 detects keywords which are marked with double quotation marks in a received message and cause the LCD driver 8 to underline. The detecting circuit 14 checks whether the detected keyword is already registered in the memory 10 or not. The registering circuit 16 registers information which is keyed in through the keyboard 13 into the memory 10 and the registering circuit 15 registers keyword and data when the keyword is not registered earlier, but registers the data automatically from the received message when the same keyword detected in the received message is found in the memory 10. Further, the electronic pocket notebook function can display all of the registered data related to a keyword by keying in an specific simple code, such as "#0" for the top keyword and "#1" for the next when two keywords appear in LCD 9, and this data has corresponding distinction marks to show whether the data is keyed in or automatically registered.

Figure 3:
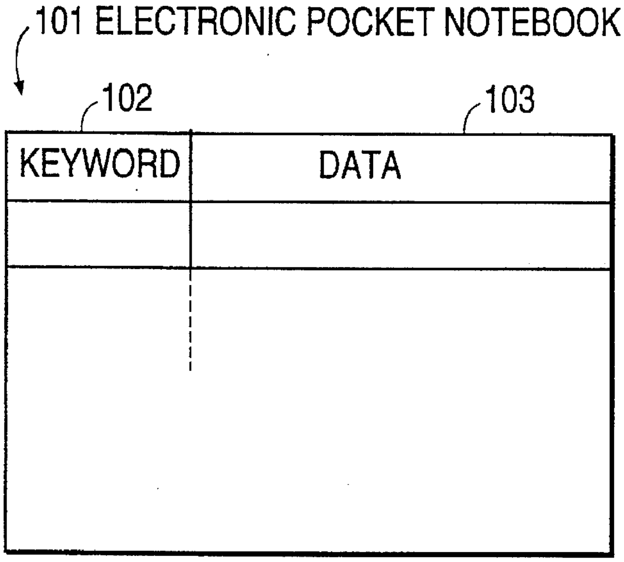
FIG. 3 is a view illustrating a specific example of an electronic pocket notebook memory area 101 within a memory 10.

FIG. 3 illustrates an arrangement of the electronic pocket notebook memory area in the memory 10. As shown therein, in the electronic pocket notebook area 101, plural sets of keywords such as personal and company names are stored in the keyword area 102 and related data such as addresses or telephone numbers is stored in the data area 103.

The keywords and data can be manually registered into the electronic pocket notebook area 101 by using a keyboard 13. That is, if keywords such as personal or company names and related data such as addresses or telephone numbers are keyed in for registration from the keyboard 13, then the registering circuit 16 registers the keyed in keywords into void areas of the keyword area 102 in the electronic pocket notebook area 101 of the memory 10, and further registers the keyed in data into the data area 103 which corresponds to the keyword. As seen in the above description, it is possible to display the data registered through the keyboard into the area 101 and the automatically registered data on the LCD 9 by operating the keyboard 13. That is, a specific simple code functions to retrieve data for an underlined keyword shown in the displayed image, and selects data if a plurality of keywords are displayed by designating a selection mark on each keyword. The retrieving circuit 17 retrieves a keyed in keyword in the memory 10.

The operation of this embodiment is described hereinafter with reference to FIGS. 1 to 6.

In FIG. 1, when a radio signal is received by the antenna 1, the signal is demodulated after being amplified by the receiver 2. The demodulated signal is converted into a digital signal by the shaping circuit 3, and compared with its own selective call number which is stored within the ID member memory 5 at the decoder 4. When its own selective call number is received and detected, the decoder 4 informs the detecting circuit 6 that a message has been received (step 21), and the detecting circuit 6 detects whether any keyword is within the message or not (step 22). If not, (step 22), the alert driver 7 then issues an alert of signal reception such as by flickering its LED 11 or buzzing the speaker 12, while the LCD driver 8 displays the received message on the LCD 9 with an underlined keyword with a selection mark (step 24). Incidentally, as in conventional pagers, the received message can be stored into the memory 10 for later redisplay.

On the other hand, in step 22, if a keyword is detected within the message (step 22), then the detecting circuit 14 checks whether the received keyword is precedingly registered in the electronic pocket notebook area 101 of the memory 10 (step 23). If the same keyword has not been registered (step 23), then the message is displayed with a lighted LCD mark to indicate that it is not registered and the signal reception alarm is issued (step 27) and, if the same keyword has been registered (step 23), then the received data is registered by the registering circuit 15 into the data area 103 of the memory 10 (step 25) and displayed on the LCD 9 with a lighted LCD mark to indicate that the keyword has been registered, and the signal reception alarm is issued (step 26).

For example, assuming that a keyword "Taro Yamada" and a corresponding data '03-3123-1234' have been registered and other information is not registered, if a message '"Hanako Tanaka" 03-3123-4567, at home' is received, then the detecting circuit 14 determines that the same information is not registered (step 23) and issues the signal reception alarm while displaying the received message on the LCD 9 as shown in FIG. 5 (*a*) and, at the same time, lighting an LCD mark 91 in order to indicate that the received keyword is not registered precedingly (step 27). Further, the received message is newly registered in the memory 10.

In addition, in the above-described situation, if a message '"Taro Yamada", 2-3, Nihonbashi 1, Chiyoda-ku' is received, then the detecting circuit 14 determines that the received keyword is precedingly registered (step 23) and the registering circuit 15 registers the received data of the keyword, that is, '2-3, Nihonbashi-1, Chiyoda-ku,' into the electronics pocket notebook area 101 as data corresponding to the keyword "Taro Yamada" (step 28). At this time, if other data has already been registered therein, the new data is registered in addition to it and is marked to indicate that the currently registered data is automatically registered data. Therefore, according to this example, since "03-3123-1234" has been already registered as data for the keyword "Taro Yamada," the new data '2-3, Nihonbashi-1, Chiyoda-ku' is additionally registered and is further marked to show that it is automatically registered data. Then, the speaker 12 issues a signal reception alert, while, at the same time, the LCD driver 8 displays the received message on the LCD 9 with an LCD mark 92 lighted to indicate that the data has been automatically registered (step 26) as shown in FIG. 5(*b*).

Then, if the user operates the keyboard 13 and requests the display of the contents of the electronic pocket notebook area 101 of the memory 10 by keying in a short code specifying the keyword, the LCD driver 8 displays the information on the LCD 9.

Figure 6:
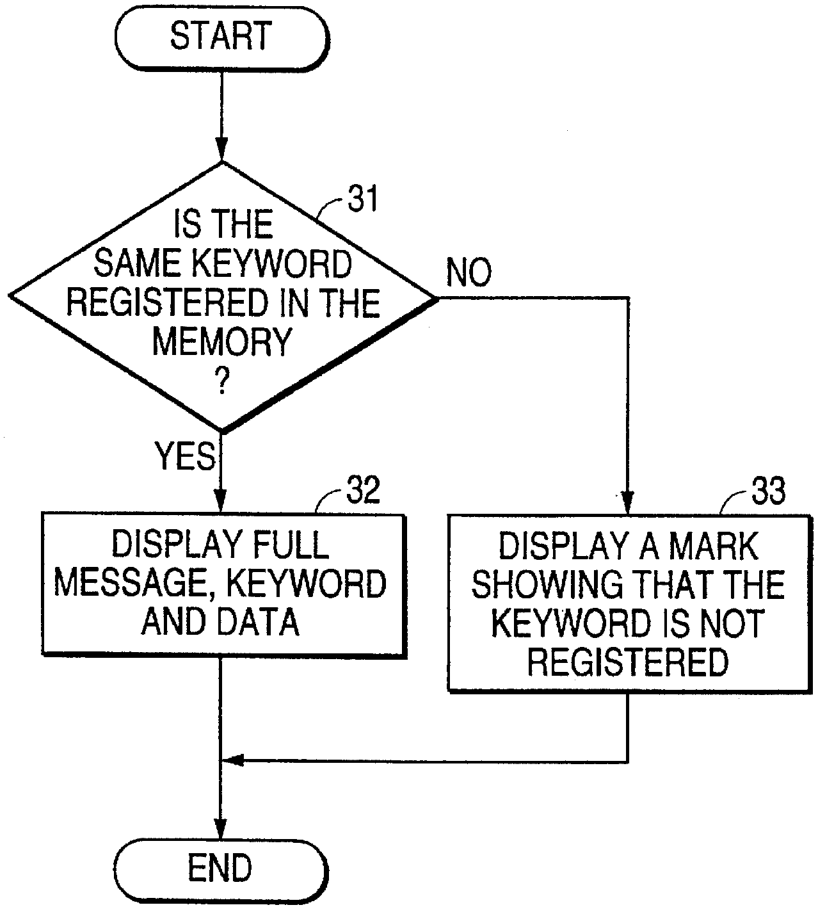
FIG. 6 is a flowchart illustrating a specific example of how the retrieving circuit 17 of FIG. 1 retrieves the keyword.
Figure 4:
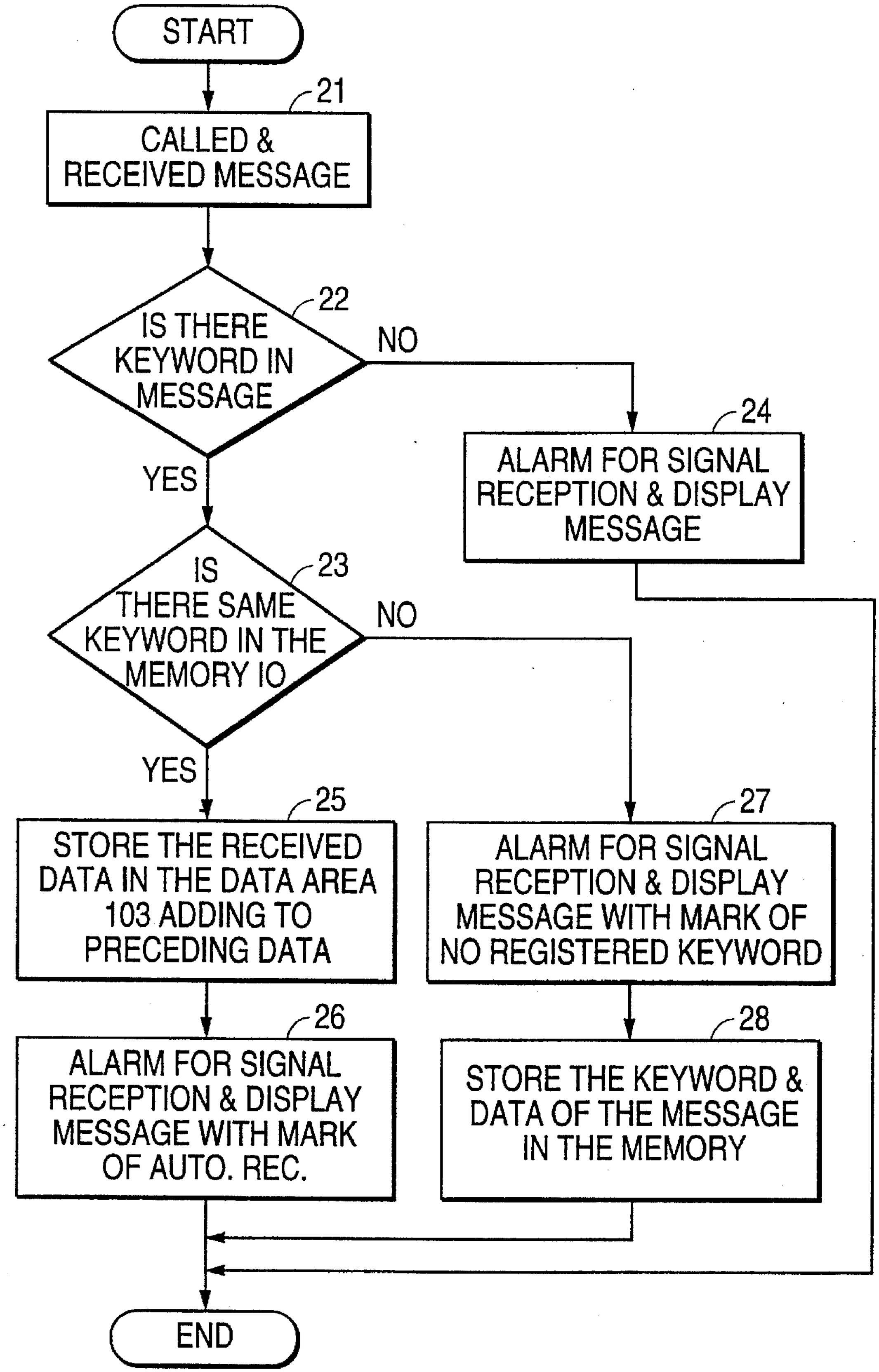
FIG. 4 is a flowchart illustrating a specific example of how a received message is processed by the first embodiment shown in FIG. 1.
Figure 5A:
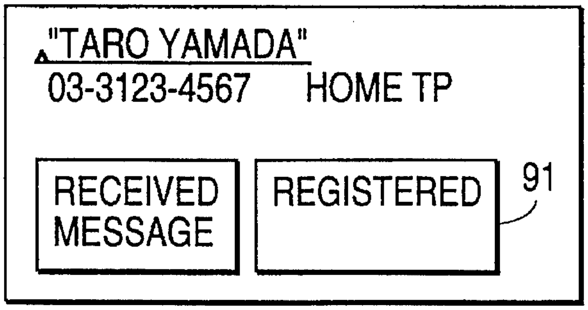
FIGS. 5(*a*), 5(*b*), 5(*c*), 5(*d*), and 5(*e*) are views illustrating examples of the displays on the LCD of FIG. 1.
Figure 5B:
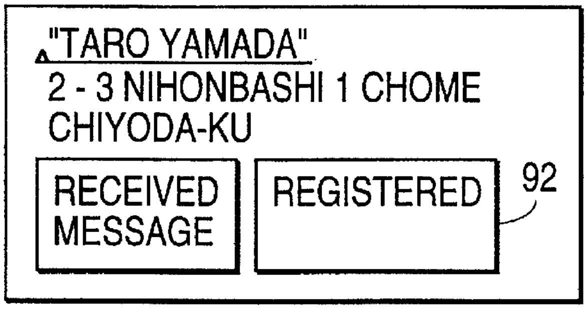
Figure 5C:
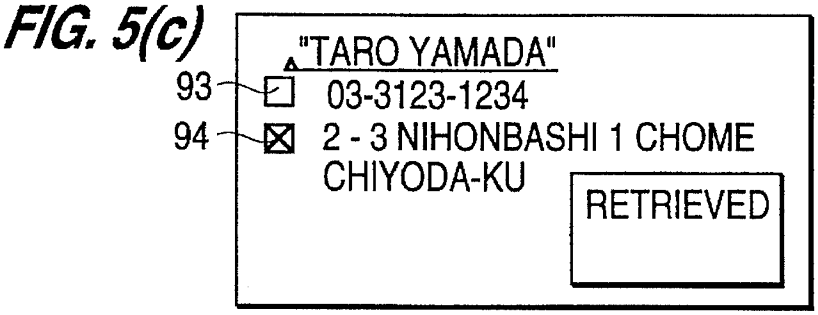
Figure 5D:
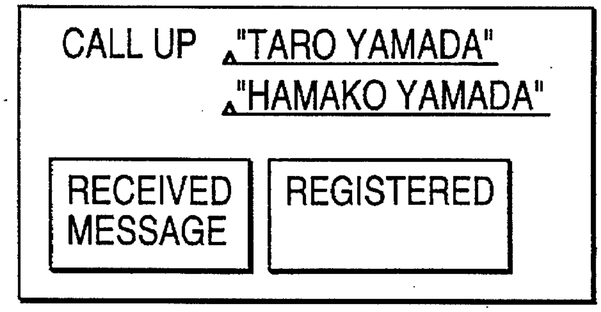
Figure 5E:
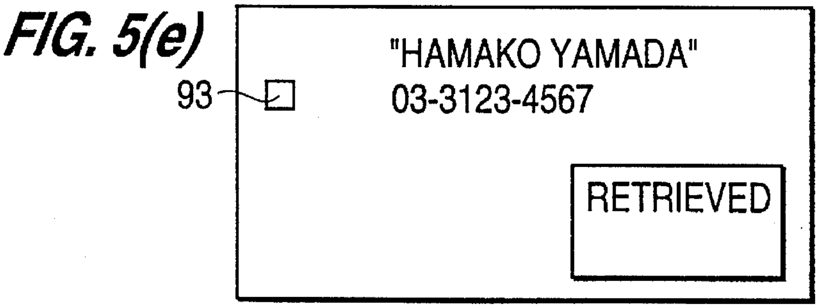
Figure 7:
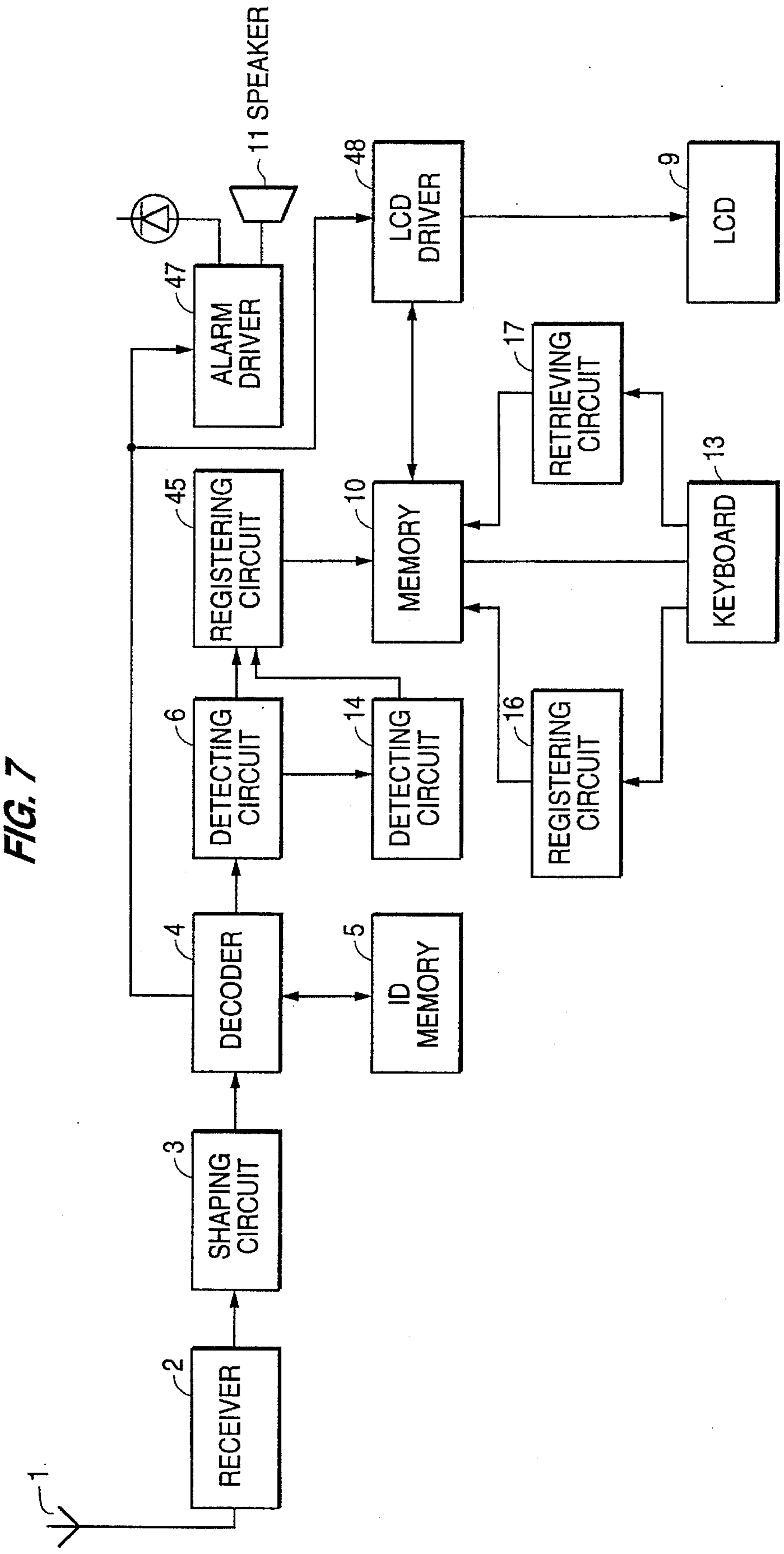
FIG. 7 is a block diagram of the second embodiment of the display-equipped radio pager which treats date information as a keyword.
Figure 8A:
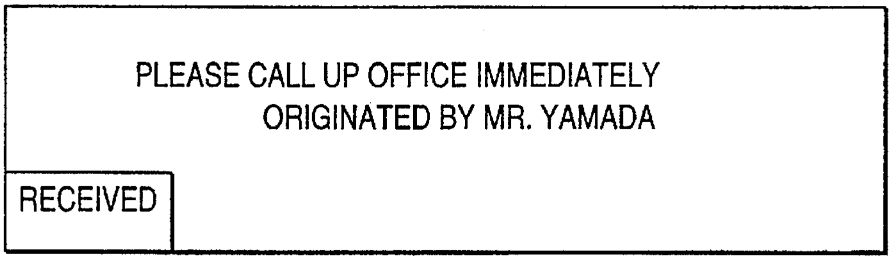
FIGS. 8(*a*), 8(*b*), 8(*c*), and 8(*d*) are LCD displays which appear when no keyword is contained in a received message, when the same keyword is detected in the memory, when the same keyword accompanied by no data is detected and when keying in a keyword, respectively.
Figure 8B:
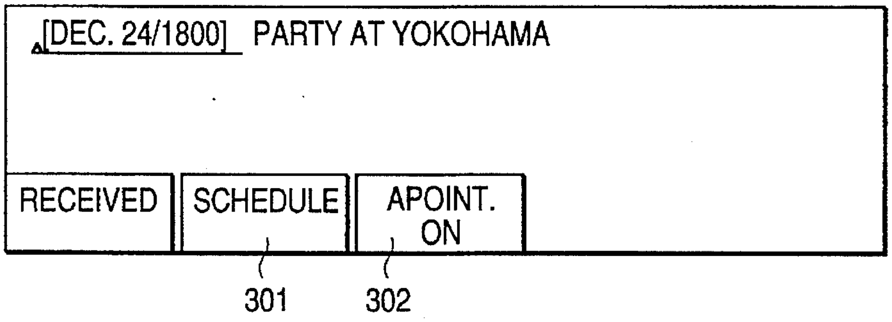
Figure 8C:
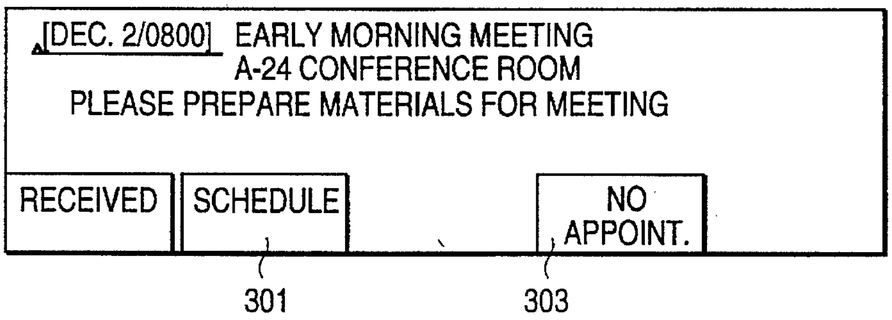
Figure 8D:
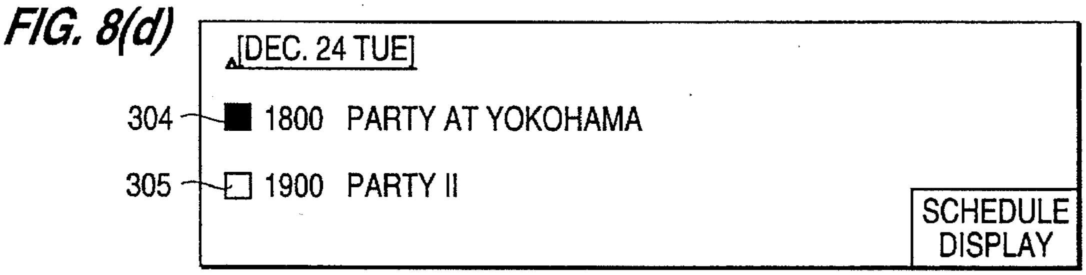

FIG. 6 is a flowchart illustrating a specific example of the retrieving operation. As shown therein, when a retrieving request is keyed in from the keyboard 13 with the keyword, the retrieving circuit 17 checks whether the same keyword is registered precedingly on the electronic pocket notebook area 101 or not (step 31) and, if not, the answer is displayed on the LCD 9 (step 32) and the retrieval operation is completed. If the same keyword is registered precedingly, it is detected and the keyword and related data are read out from the electronic pocket notebook area 101 to be displayed on the LCD 9 (step 33). At this time, the data classes are also displayed together. For example, assuming that the keyword "Taro Yamada" and the data '03-3123-1234' are already registered by keying in through the keyboard and the data '2-3, Nihon-bashi-1, Chiyoda-ku' is data which has been automatically registered from a message, if retrieval is initiated by keying in "#0," an image as shown in FIG. 5(*c*) is then displayed on the LCD 9. In the same figure, an LCD mark 93 indicates that the data '03-3123-1234' is information keyed in from the keyboard 13, and another LCD mark 94 indicates that the data '2-3, Nihonbashi-1, Chiyoda-ku' is automatically registered data, that is, from a received message. When two keywords are detected in the received message as shown in FIG. 5(*d*) and retrieval is initiated by keying in "#1," the data for the other keyword is displayed on the LCD 9 as shown in FIG. 5(*e*). FIG. 7 is a block diagram of the second embodiment of a display-equipped radio pager according to the present invention.

This radio pager deals with date information such as year, month, day, time, and day of the week as a keyword, and a schedule on the date information as the data.

This radio pager comprises the same components of the first embodiment, but the registering circuit 15, the alarm driver 7 and the LCD driver 8 are provided with added functions and are altered so as to take the new form of registering circuit 45, alarm driver 47 and LCD driver 48, respectively.

The registering circuit 45 registers received date information and schedule when the same keyword is not detected in the memory 10 and informs the LCD driver 48 that the received message is newly registered in the memory 10. When the same keyword is detracted in the memory, the registering circuit 45 registers only the received data on the date area 103 of the keyword in the memory 10, and informs the LCD driver 48 and the alarming driver 47 that the same keyword has been detected in the memory 10. The alarming driver 47 issues a different alarm tone, such as an alarm of different period and frequency than the ordinary signal reception alarm, when it is informed that the received keyword is detected in the memory.

Figure 9:
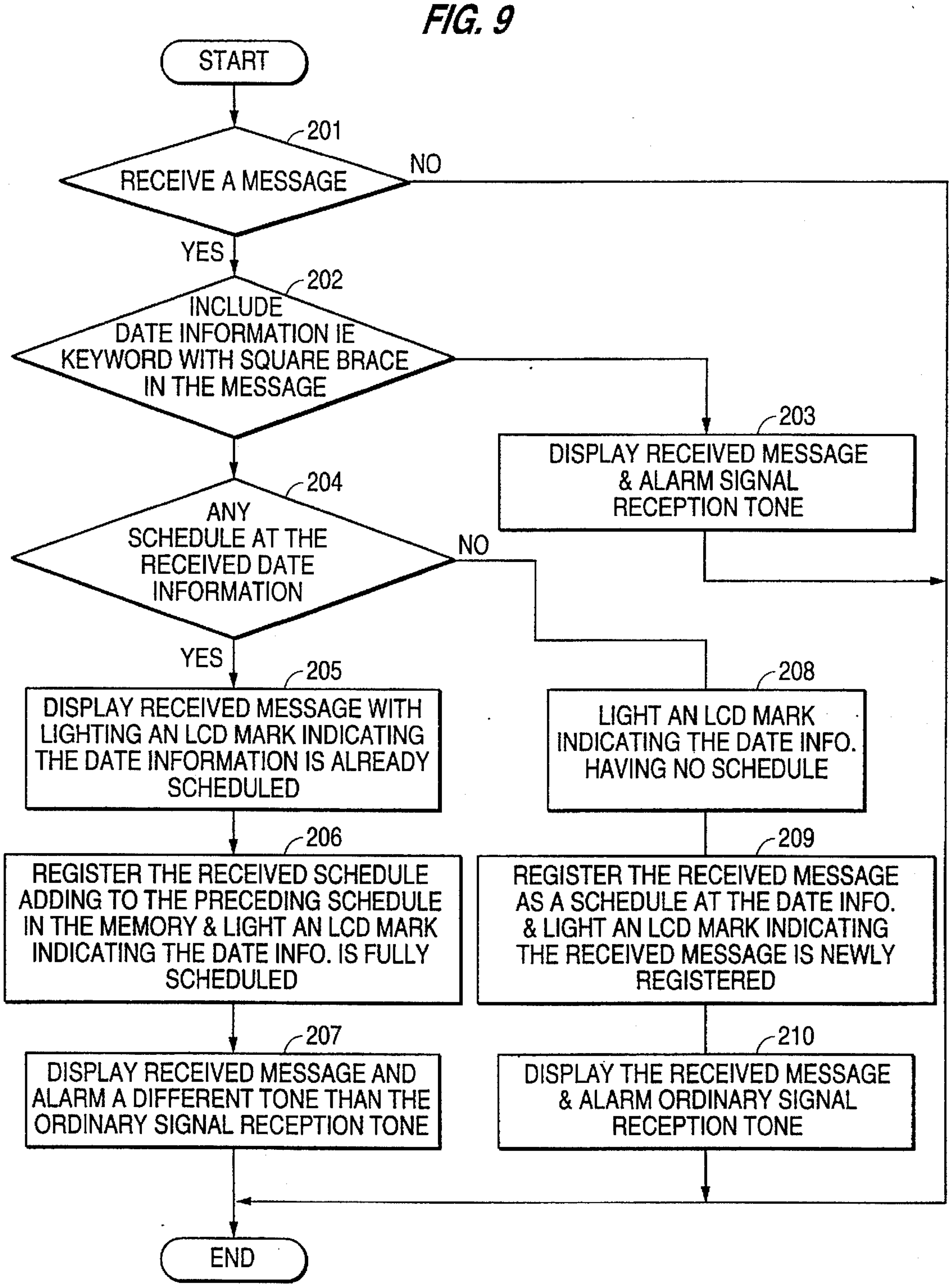
FIG. 9 is a flow chart of the second embodiment.

FIG. 9 is a flow chart showing the operation of the second embodiment. When the display-equipped radio pager receives a message (step 201), the detecting circuit 6 detects whether a keyword, which is the square-braced date information, is included or not (step 202), and if no keyword is detected, the LCD driver 48 displays the received message, and the ordinary signal reception tone is sounded (step 203). When the detecting circuit 6 detects a keyword, the detecting circuit 14 detects whether the received keyword is registered precedingly in the memory or not (step 204), and if the received keyword is detected in the memory, the registering circuit 45 registers the received data in the data area of the keyword by adding to the preceding registered data, and the LCD driver 28 displays the received message together with a lighted LCD mark 301 (step 206). Further, the LCD driver 48 lights the LCD mark to indicate that a message has been received and the alarm driver 47 issues an alarm with a different tone to indicate double scheduling. When the detected keyword in the memory has no data in its data area, the LCD driver displays the received message on the LCD 9 with a lighted LCD mark 303 which indicates that the detected keyword has no registered data (step 208). After registering the received data in the data area 103 of the keyword, the LCD driver 48 lights an LCD mark 301 which indicates that the date is newly registered in the memory (step 209). Further, the alarm driver 47 issues an ordinary signal reception tone (step 210).

Although the LCD driver 48 displays only a received message on the LCD 9 when no keyword is detected in the message as is shown in FIG. 8(*a*), the LCD driver 48 displays the received message on the LCD 9 with a lighted LCD mark 301 such as 'scheduled' which indicates that the message is newly registered. When the LCD driver 48 is informed that the received keyword has not been detected in the memory 10, it just registers it and the LCD driver 48 displays the received message on the LCD 9 with a lighted LCD mark 302 such as 'appointment on' which indicates that the received keyword is detected in the memory 10 accompanied by data as is shown in FIG. 8(*b*). If the detected keyword in the memory 10 has no data, another LCD mark 303 such as 'no appointment' is lighted with the displayed received message as is shown in FIG. 8(*c*).

When the user keys in a keyword or date information for retrieval, the LCD driver 48 displays all stored data related to the keyword with marks 304, 305 indicating whether the data has been automatically registered from a message or registered through the keyboard 13, respectively, as shown in FIG. 8(*d*).

What is claimed is:

1. A display-equipped radio pager comprising:

a display;

means for inputting a keyword and corresponding data to said radio pager, said keyword being distinguished by a predetermined mark;

a memory in which keywords and data are registered;

a first register means for registering inputted keywords and data in said memory;

a first display controller means for displaying inputted keywords and data registered within the memory;

- a first detection means for detecting keywords contained within a received paging message;
- a second detection means for detecting whether a keyword which is detected by the first detection means is previously registered in the memory;
- a second register means for registering in the memory the data received with the keyword detected by the first detection means, the data being added to previously registered data corresponding to said keyword when the second detection means detects that the data received with said keyword is not previously registered; and
- a second display controller means for displaying, with a mark indicating newly automatically registered data, the data registered by the second register means, together with the previously registered data corresponding to said keyword.

2. A display-equipped radio pager as claimed in claim 1, wherein the radio pager further includes a third display controller means to display marks indicating whether the data displayed by said second display controller means are data registered through said inputting means or automatically registered from the received paging message.

3. A display-equipped radio pager as claimed in claim 1, wherein said keywords include information regarding date, time and day of the week.

4. A display-equipped radio pager as claimed in claim 3, wherein said radio pager further includes:

- a fourth display controller means for displaying a mark on a received data indicating that a designated time and date of the received data are occupied by another appointment when the time and date are detected in said memory by said second detection means and displaying another mark indicating that the designated time and date are newly registered in said memory when the designated time and date are not detected in said memory by said second detection means.

5. A display-equipped radio pager as claimed in claim 4, wherein the radio pager further includes an alert means for alerting by a first tone and/or flash to notify a user when the designated time and date are previously occupied and a second tone and/or flash to notify the user that the designated time and date are newly registered.

* * * * *